United States Patent [19]
Kelly et al.

[11] Patent Number: 5,975,343
[45] Date of Patent: *Nov. 2, 1999

[54] COLLECTION CONTAINER ASSEMBLY

[75] Inventors: Karin E. Kelly, Los Angeles, Calif.; C. Lester Player; Robert L. Whitehead, both of Sumter, S.C.

[73] Assignee: Becton Dickinson and Company, Franklin Lakes, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/928,616

[22] Filed: Sep. 12, 1997

[51] Int. Cl.⁶ .................................................... B65D 21/02
[52] U.S. Cl. .................. 220/737; 220/23.86; 220/23.87; 220/921
[58] Field of Search .............................. 220/23.83, 23.86, 220/737, 23.91, 23.87, 23.89, 921

[56] References Cited

U.S. PATENT DOCUMENTS

| | | |
|---|---|---|
| 3,941,237 | 3/1976 | MacGregor, Jr. ..................... 220/737 |
| 4,483,616 | 11/1984 | Liston et al. ............................ 356/246 |
| 4,578,588 | 3/1986 | Galkin ...................................... 250/432 |
| 4,915,255 | 4/1990 | Curtis .................................... 220/23.86 |
| 4,980,129 | 12/1990 | Columbus ................................ 422/61 |
| 5,096,062 | 3/1992 | Burkhardt et al. ..................... 206/361 |
| 5,137,693 | 8/1992 | Mawhirt ................................. 206/446 |
| 5,167,929 | 12/1992 | Korf et al. ............................. 422/102 |
| 5,236,604 | 8/1993 | Fiehler .................................... 210/782 |
| 5,454,958 | 10/1995 | Fiehler .................................... 210/782 |
| 5,456,887 | 10/1995 | Calvo et al. ........................... 422/104 |
| 5,499,747 | 3/1996 | Quennessen ........................... 206/446 |
| 5,536,476 | 7/1996 | Baxter .................................... 422/102 |
| 5,542,562 | 8/1996 | Oratz ..................................... 220/23.86 |

Primary Examiner—Stephen Castellano
Attorney, Agent, or Firm—Nanette S. Thomas, Esq.

[57] ABSTRACT

The present invention is a collection container assembly comprising a container and a removable and reusable tubular sleeve whereby the container fits within the tubular sleeve and wherein the external dimensions of the assembly are substantially the same as a standard-sized blood collection tube but with a reduced internal volume.

8 Claims, 6 Drawing Sheets

COLLECTION CONTAINER ASSEMBLY

BACKGROUND OF THE INVENTION

1. Field of the Invention

This invention relates to a specimen collection container assembly and more particularly to a collection container for collecting biological fluid specimens where a small quantity of fluid may be collected and retained in the container while maintaining a container size sufficient to be easily accommodated and/or compatible with standard clinical equipment and instrumentation.

2. Description of Related Art

Blood samples and other biological fluid specimens are routinely taken and analyzed in hospital and clinical situations for various medical purposes. Collection, handling and testing of these samples typically requires the use of various medical testing instruments. As the blood and fluid specimens are usually collected in a standard sized collection tube, the medical instruments used to test the samples are designed to accommodate these standard sized collection tubes.

Conventional blood collection tubes used in most clinical situations are elongated cylindrical containers having one end closed by a semi-spherical or rounded portion and an opposed open end. The open end may be sealed by a resilient cap or stopper. The tube defines a collection interior which collects and holds the blood sample. The most common size of these blood collection tubes are designed to accommodate approximately 10 ml of blood or other biological fluid samples. Illustrative of such blood collection tubes is the VACUTAINER® brand blood collection tube sold by Becton, Dickinson and Company, 1 Becton Drive, Franklin Lakes, N.J. (registered trademark of Becton, Dickinson and Company).

A phlebotomist or other medical technician typically obtains a specimen of the patient's blood in the tube by techniques well known in the art. The tube is then appropriately labeled and transferred from the site of collection to a laboratory or other location where the contents of the tube are analyzed. During collection and analysis the tube may be supported by various medical instruments. The plasma or serum derived therefrom is processed and analyzed either manually, semiautomatically or automatically. In some cases, the specimen must first be dispensed from the collection tube to a sample test tube or cuvette.

In certain situations it is only necessary to obtain a small quantity of blood or other biological fluid specimens. These situations may include pediatric, or geriatric patients and other instances where large blood samples are not required. Small quantities of blood cannot be easily collected in standard collection tubes as described above because the sample level in such containers would not be adequate for retrieval prior to analysis. Such small quantities of fluids also have a tendency to significantly evaporate when stored in larger containers, thus concentrating the chemical and enzymatic constituents therein. This may result in erroneous analytical results and could possibly affect the diagnosis and treatment given to the patient. Therefore, it is desirable to employ small-volume containers which substantially inhibit evaporation for the storage and delivery of minute fluid samples in the laboratory.

Various specimen containers such as those incorporating a "false bottom" have been proposed to achieve decreased volume capacity in conjunction with standard external dimensions. However, these various specimen containers are not compatible with standard clinical equipment and instrumentation due to their design. In particular, these specimen containers have false bottoms with a generally flat, planar bottom end and a circular shaped opening.

Other specimen containers include partial-draw tubes which have standard external dimensions with partial evacuation so that blood fills only a portion of the internal volume. However, partial-draw tubes exhibit a reduction in the draw rate of a sample which reduces the collection efficacy of such tubes. In addition, partial-draw tubes may result in an inconsistent fill volume which may alter test results. Furthermore, it is difficult to determine accurate sample quantities with such partial-draw tubes because the slow rate of sample draw is not consistently measurable.

In clinical use, it is desirable for such specimen collection containers to have rounded bottom configurations that closely simulate a standard-sized blood collection tube configuration instead of planar bottoms. Rounded bottom configurations facilitate compatibility with clinical equipment and instrumentation.

Therefore there is a need to provide a specimen collection container assembly for collecting blood samples and other biological fluid specimens of relatively small volumes where the assembly may be accommodated and/or compatible with standard clinical equipment and/or instrumentation and where the integrity of the sample and specimens are maintained during draw, storage and transport.

SUMMARY OF THE INVENTION

The present invention is a collection assembly comprising a container and a tubular sleeve. The container preferably comprises an open top portion, a closed bottom portion and a sidewall extending from the open top portion to the closed bottom portion. The tubular sleeve preferably comprises opposing open portions identified as an open top portion, and an open bottom portion and a cylindrical sidewall extending between the opposing open ends. Most preferably, the container fits within the tubular sleeve.

Desirably, the external diameter of the container is less than the internal diameter of the tubular sleeve. Desirably, the external dimensions of the container are less than the external dimensions of the tubular sleeve.

The tubular sleeve of the assembly provides a means for allowing the container to be modified so as to be compatible with standard clinical equipment and instrumentation.

The tubular sleeve is removably secured to the container whereby the container is inserted into the tubular sleeve by force friction or an interference fit.

The tubular sleeve may be the same or different material than the container and may be integral with the container or may be a discrete member so as to be reusable.

The tubular sleeve is removably unsecured from the container whereby the user slightly twists or pulls the container and the tubular sleeve in opposite rotating directions thereby removing the tubular sleeve from the container. The tubular sleeve then can be used again.

In addition, the assembly may further comprise a closure such as a cap or a stopper at the open end of the container.

Preferably, the external dimensions of the assembly which includes the container and the tubular sleeve are about the same or substantially the same as a standard-sized or full draw blood collection container assembly.

Standard-sized full draw blood collection containers have an outer diameter of about 13 to about 16 millimeters, a length of about 75 to about 100 millimeters and an internal volume of about 6 to 10 milliliters.

Most preferably, the assembly of the present invention can be either evacuated or non-evacuated. Desirably, the assembly is made from polyethylene terephthalate, polypropylene, polyethylene, polyethylene napthalate polyvinyl chloride or copolymers thereof.

An advantage of the assembly of the present invention is that it provides a full-draw blood collection container assembly having a reduced internal volume but with external dimensions about the same or substantially the same as a standard-sized blood collection container assembly. In addition, the assembly of the present invention has a standard draw rate as compared to partial draw rate tubes.

A further advantage of the assembly of the present invention is that it provides a specimen collection container which is universally compatible with various clinical equipment and instrumentation.

The assembly of the present invention may be easily handled by equipment configured to handle standard-sized blood collection tubes having standard external dimensions.

Most notably, is that the assembly of the present invention provides a blood collection container having full draw external dimensions but with a reduced internal volume as compared to standard-sized full draw blood collection tubes or standard-sized partial draw blood collection tubes.

The assembly of the present invention therefore addresses the need for a full-draw low-volume blood collection container assembly that presents the external dimensions of a standard-sized blood collection tube.

The assembly of the present invention may be used to reliably collect small samples of blood or biological fluids and to maintain the integrity of the samples during storage and transport as compared to using standard-sized blood collection tubes. In addition, the assembly of the present invention can also be accommodated by standard-sized blood collection, transportation, storage, and diagnostic equipment. Furthermore, the assembly of the present invention may be used to reliably collect small samples of blood or biological fluids without being under partial pressure.

The assembly of the present invention is also compatible with existing instrumentation, labels, and bar code readers and obviates the need for new instrumentation and handling devices or procedures that would be required for smaller or varying sized tubes or tubes with flat planar bottoms.

DETAILED DESCRIPTION

The present invention may be embodied in other specific forms and is not limited to any specific embodiment described in detail which is merely exemplary. Various other modifications will be apparent to and readily made by those skilled in the art without departing from the scope and spirit of the invention. The scope of the invention will be measured by the appended claims and their equivalents.

Figure 1:
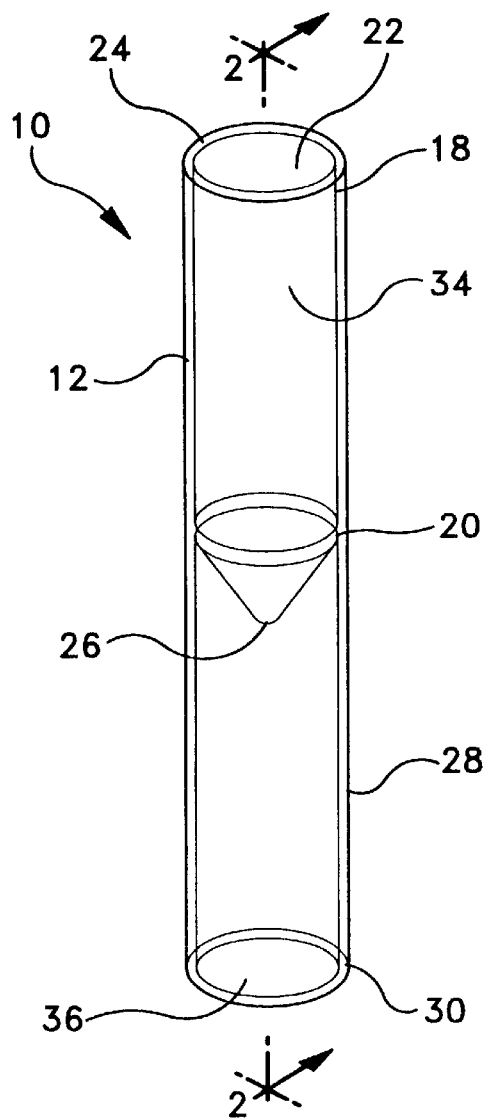
FIG. 1 is a perspective view of a false bottom specimen tube of the prior art.
Figure 2:
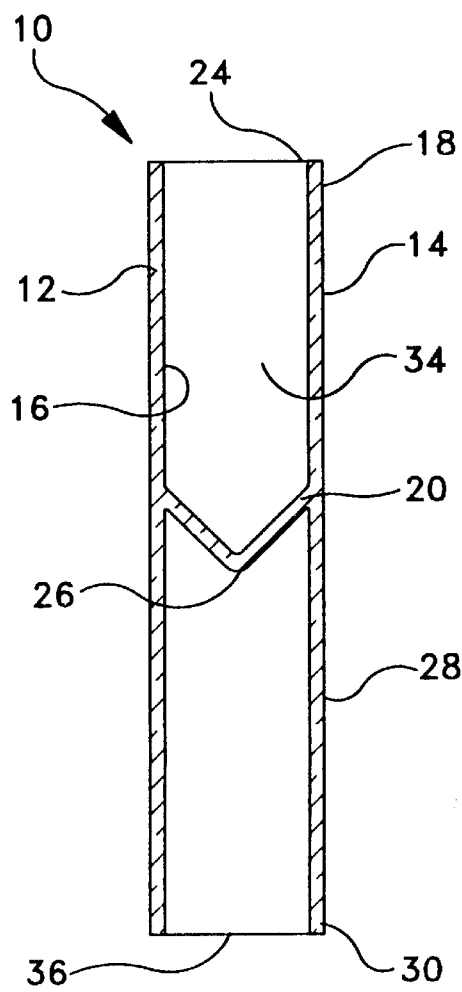
FIG. 2 is a longitudinal sectional view of the tube of FIG. 1 taken along line 2—2 thereof.

Referring to the drawings in which like reference characters refer to like parts throughout the several views thereof, FIGS. 1 and 2 show a false bottom specimen container 10 of the prior art, having a sidewall 12 having an outer surface 14 and an inner surface 16. Sidewall 12 extends from an upper portion 18 to a lower portion 20. Upper portion 18 includes an open end 22 and a rim 24. Lower portion 20 comprises a closed bottom end 26. An annular skirt 28 extends from lower portion 20 and outer surface 14 to a flat planar bottom end 30 to define an open false bottom area 36. Interior volume 34 extends between rim 24 and closed bottom end 26.

Figure 3:
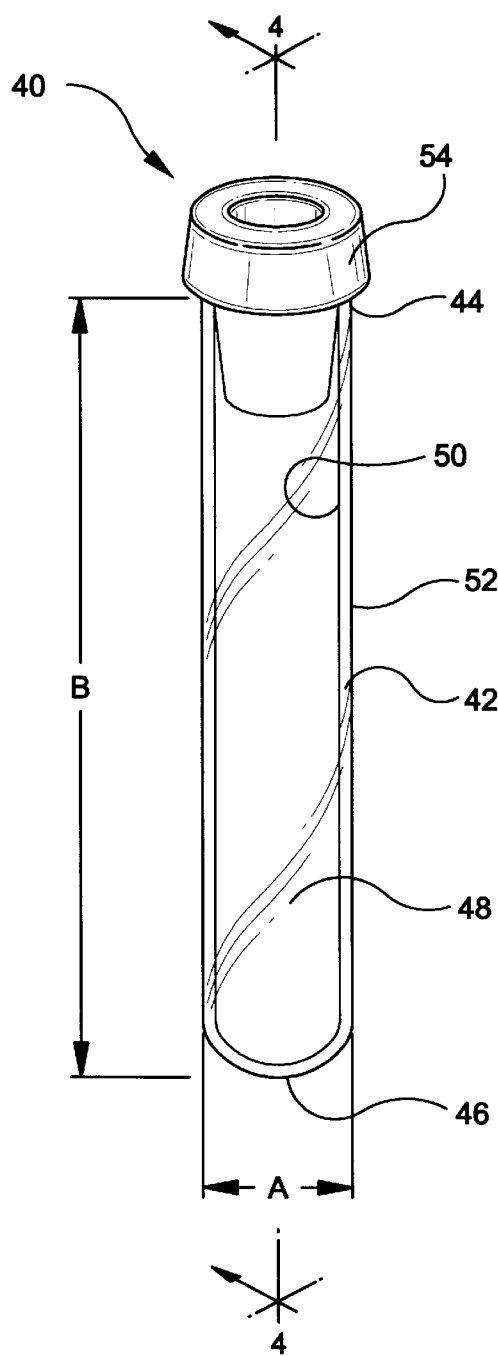
FIG. 3 is a perspective view of a standard sized blood collection tube.
Figure 4:
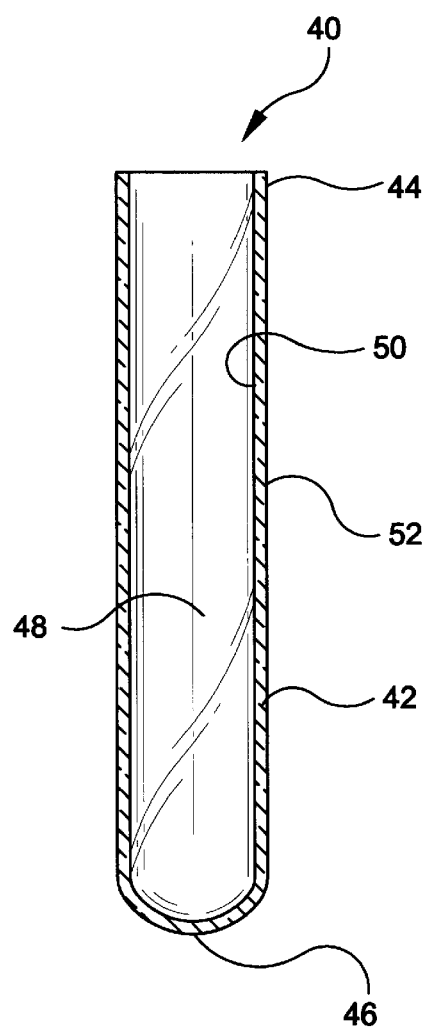
FIG. 4 is a longitudinal sectional view of the tube of FIG. 3 taken along line 4—4 thereof without the stopper.

Referring to the drawings in which like reference characters refer to like parts throughout the several view thereof, FIGS. 3 and 4 show a typical standard sized blood collection tube 40, having a sidewall 42 extending from an open end rim 44 to a closed end 46 and an interior area 48. Sidewall 42 has an inner wall surface 50 and an outer wall surface 52. Optionally, a closure 54 may be on the open end rim 44 of tube 40.

Tube 40 is most preferably a standard-sized blood collection tube having an outer diameter A of about 13 millimeters, a length B of about 75 millimeters and an internal volume 48 of about 10 milliliters as measured from rim 44 to closed end 46.

Interior area 48 is typically maintained at a lower-than-atmospheric internal pressure so that when a blood collection probe penetrates through the closure placing interior area 48 in communication with the circulatory system of a patient, the 48 will draw blood from the patient into the tube. Tube 40 may be described as a full-draw evacuated blood collection tube because the internal pressure of interior area 48 is low enough to draw a volume of blood substantially equal to the volume of interior area 48.

Figure 5:
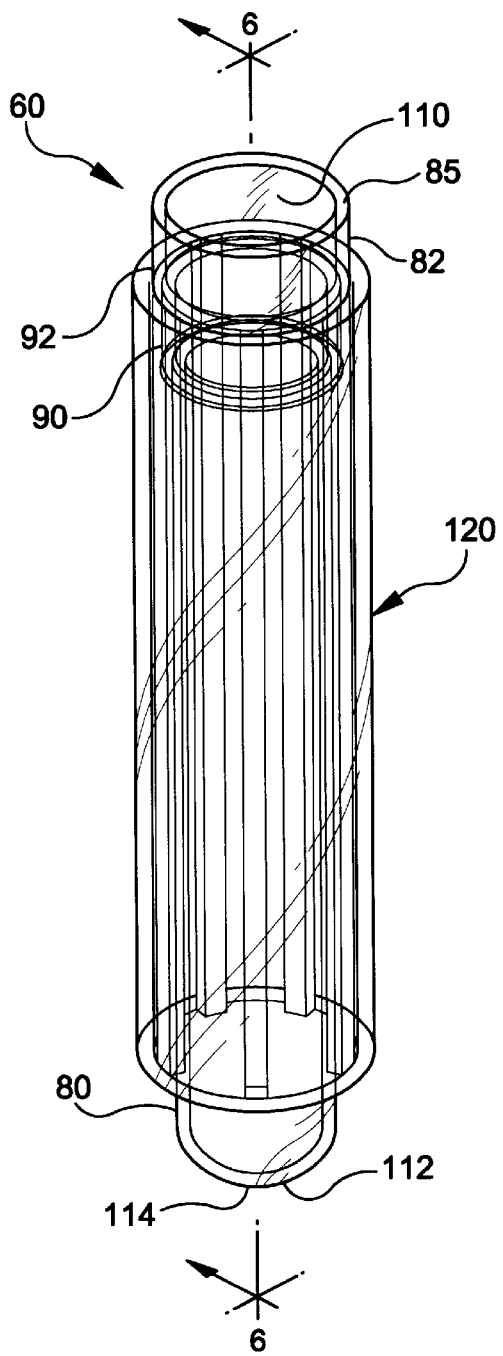
FIG. 5 is a perspective view of the assembly of the present invention.
Figure 6:
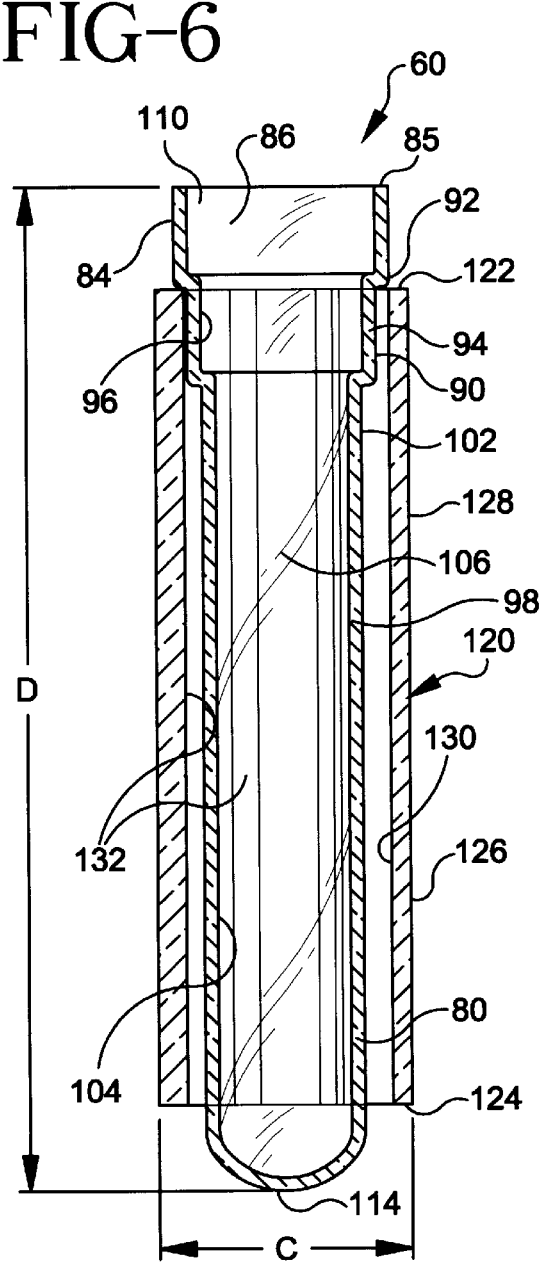
FIG. 6 is a longitudinal sectional view of the assembly of FIG. 5 taken along line 6—6 thereof.

Referring to the drawings in which like reference characters refer to like parts throughout the several views thereof, FIGS. 5 and 6 show the preferred embodiment of the present invention, assembly 60. Assembly 60 comprises a container 80 and a tubular sleeve 120.

Container 80 comprises an open end portion 110 and a closed end portion 112 whereby closed end portion 112 has a semi-spherical wall end 114. Container 80 comprises a first cylindrical sidewall 82 having an outer surface 84 and an inner surface 86. First cylindrical sidewall 82 extends from a rim 85 towards a second cylindrical sidewall 90. A shoulder 92 connects first cylindrical sidewall 82 and second cylindrical sidewall 90. Second cylindrical sidewall 90 has a smaller internal and external diameter than first cylindrical sidewall 82. Second cylindrical sidewall 90 comprises an outer surface 94 and an inner surface 96. Second cylindrical sidewall 90 extends towards a third cylindrical sidewall 98. A shoulder 100 connects second cylindrical sidewall 90 and third cylindrical sidewall 98. Third cylindrical sidewall 98 has a smaller internal and external diameter than second cylindrical sidewall 90. Third cylindrical sidewall 98 extends to closed end portion 112. Third cylindrical sidewall 98 comprises an outer surface 102 and an inner surface 104.

An interior volume 106 extends between rim 85 and semi-spherical wall end 114.

Figure 7:
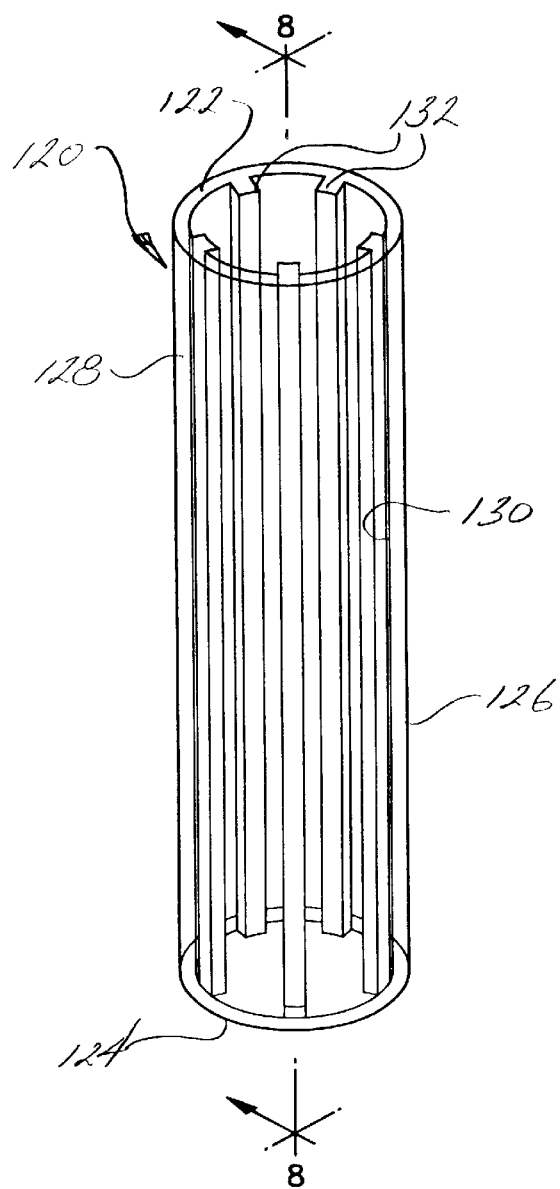
FIG. 7 is a perspective view of the tubular sleeve of the assembly of FIG. 5.
Figure 8:
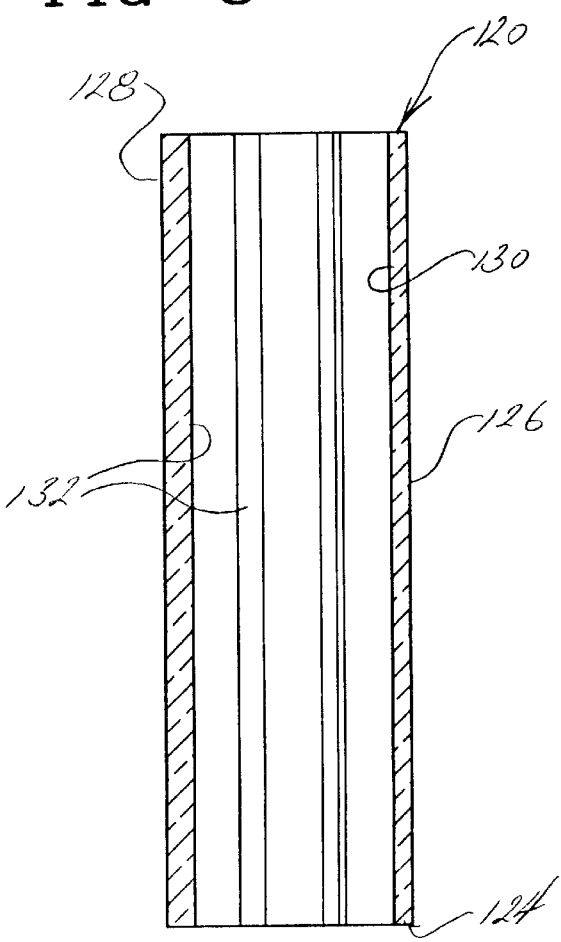
FIG. 8 is a longitudinal sectional view of the tubular sleeve of FIG. 7 taken along line 8—8 thereof.

As shown in FIGS. 7 and 8, tubular sleeve 120 includes an open top portion 122, an open bottom portion 124, and a sidewall 126 extending from the top portion to the bottom portion. It is within the purview of this invention that there is no distinction between top and bottom portions of the tubular sleeve other than they are opposing ends.

Sidewall 126 of tubular sleeve 120 includes an outerwall surface 128 and an inner wall surface 130. Optionally, a plurality of ribs 132 are associated on inner wall surface 130. Ribs 132 assist with the removable secure fit of the tubular sleeve and the container. However, it is within the purview of this invention that ribs 132 are not on the tubular sleeve and that the external dimensions of the container and internal dimensions of the tubular sleeve will permit an interference fit.

Tubular sleeve 120 provides means for converting the container to substantially the same external dimensions as a standard-sized blood collection tube.

As shown in FIG. 5, assembly 60 has an outer diameter C of about 13 millimeters, as measured by the external dimensions of tubular sleeve 120, a length D of about 75 millimeters, as measured from rim 85 to semi-spherical wall end 114, and an interior volume 106 of about 1 to 3 milliliters. The external diameter E of s tubular sleeve 120 is about 13 millimeters. It is within the purview of this invention that assembly 60 may have an outer diameter of about 13 to about 16 millimeters, a length of about 75 to about 100 millimeters and an interior volume of about 1 to about 3 milliliters.

As shown in FIG. 5, tubular sleeve 120 is readily compatible with container 80. Container 80 may be inserted into tubular sleeve 120 through either open top portion 122 or open bottom portion 124. Most preferably, inner wall surface 130 or ribs 132 of tubular sleeve 120 mates or fits with outer surface 94 of second cylindrical sidewall of container 80 whereby an interference fit or frictional engagement between them holds container 80 within tubular sleeve 120.

Figure 9:
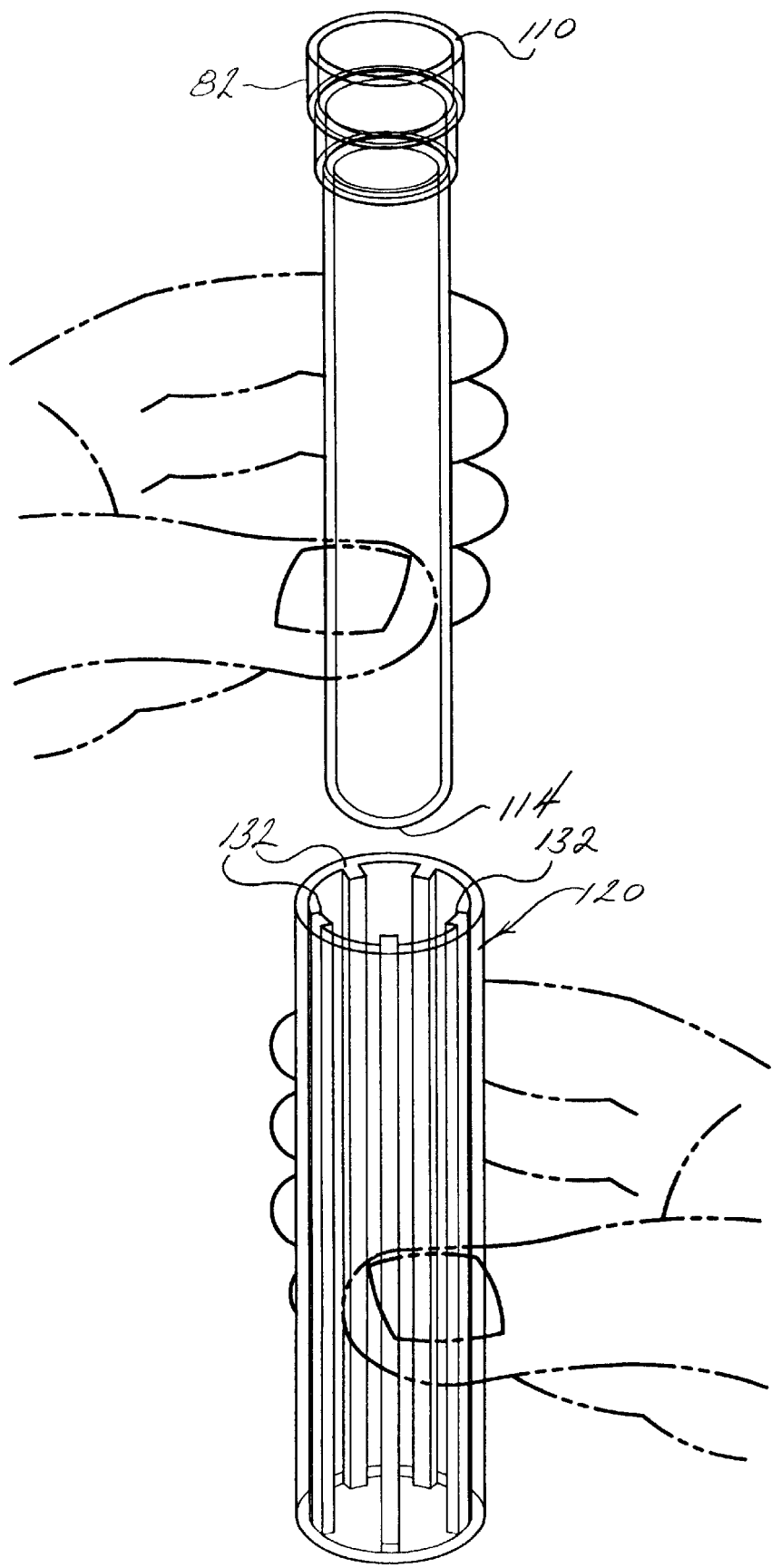
FIG. 9 illustrates the removal of the tubular sleeve from the container.

As shown in FIG. 9, the tubular sleeve may be removed from the assembly whereby the user slightly twists or pulls the container and the tubular sleeve in opposite directions thereby removing the tubular sleeve from the container. The tubular sleeve can then be reused.

The length of container 80 and tubular sleeve 120 may be varied so that closed end portion 112 of container 80 may be located within tubular sleeve 120 or extend through the one of the opposing open ends 122 or 124 of tubular sleeve 120.

Tubular sleeve 120 may be formed from a thermoformed plastic such as thermoplastic elastomer, polyvinylchloride, polyurethane, polyethylene or polypropylene.

Figure 10:
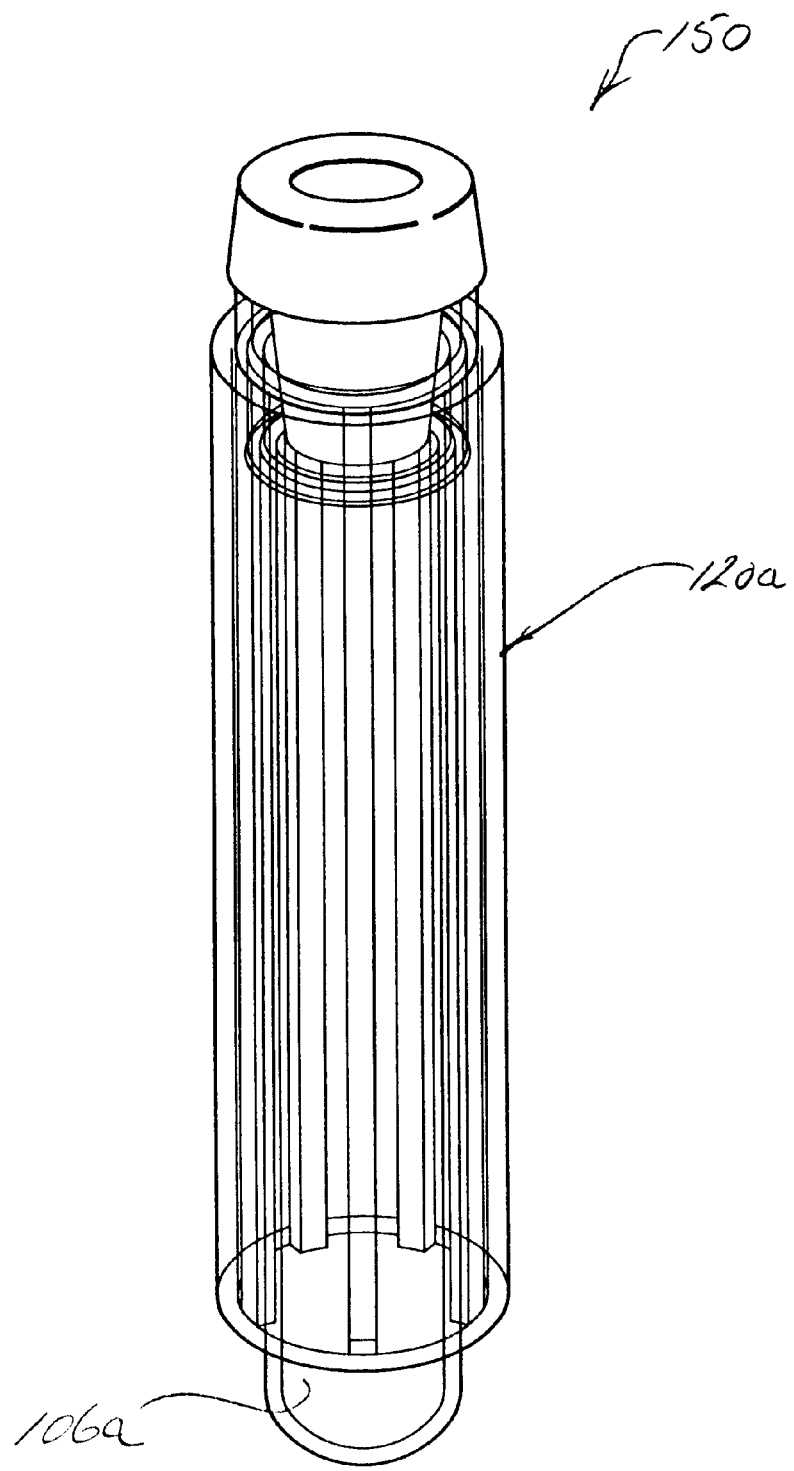
FIG. 10 is a perspective view of an alternate embodiment of the present invention, similar to the assembly of FIG. 5, but with a closure.

The invention, as shown in FIG. 10 includes many components which are substantially identical to the components of FIGS. 5–6. Accordingly, similar components performing similar functions will be numbered identically to those components of FIGS. 5–6, except that a suffix "a" will be used to identify the similar components in FIG. 10.

As illustrated in FIG. 10, a further embodiment of the invention is assembly 150 which includes a closure 160.

The embodiment of FIG. 10 may be evacuated or non-evacuated. When assembly 150 is evacuated, interior volume 106a is maintained at a lower-than-atmospheric internal pressure so that when a blood collection probe penetrates through the closure placing interior volume 106a in communication with the circulatory system of a patient, the lower-than-atmospheric pressure of interior volume 106a will draw blood from the patient into the tube. Assembly 150 may be described as a full-draw evacuated blood collection tube because the internal pressure of interior volume 106a is low enough to draw a volume of blood substantially equal to the volume of interior volume 106a.

What is claimed is:

1. A collection assembly comprising:
    a container comprising a top portion, a bottom portion, a sidewall extending from said top portion to said bottom portion, a rim at said top portion, a first cylindrical sidewall, a second cylindrical sidewall and a third cylindrical sidewall, whereby said first cylindrical sidewall extends from said rim towards said second cylindrical sidewall and said second cylindrical sidewall extends towards said third cylindrical sidewall and a tubular sleeve comprising opposing open ends, a cylindrical sidewall extending between said opposing open ends; said cylindrical sidewall of said tubular sleeve comprises an outerwall surface and an inner wall surface and a plurality of ribs associated with said inner wall surface, whereby said container fits within said tubular sleeve and said plurality of ribs and said inner wall surface of said tubular sleeve mate or fit with said outer surface of said second cylindrical sidewall of said container.

2. The assembly of claim 1, wherein said bottom portion of said container is a closed bottom end having a semi-spherical end.

3. The assembly of claim 1, further comprising a closure.

4. The assembly of claim 1, wherein said container and said tubular sleeve are made from polyethylene terephthalate, polypropylene, polyethylene, polyethylene napthalate, polyvinyl chloride, or copolymers thereof.

5. The assembly of claim 1, wherein said tubular sleeve is made from a thermoformed plastic.

6. The assembly of claim 5, wherein said thermoformed plastic is a thermoplastic elastomer, polyvinylchloride, polyurethane, polyethylene or polypropylene.

7. The assembly of claim 1, further comprising an outer diameter, a length and an interior volume, wherein said diameter is about 13 to about 16 millimeters, said length is about 75 to about 100 millimeters, and said outer interior volume is about 1 to 3 millimeters.

8. A collection assembly comprising:
    a container comprising a top portion, a bottom portion, a sidewall extending from said top portion to said bottom portion, a rim at said top portion, a first cylindrical sidewall comprising an outer surface and an inner surface, a second cylindrical sidewall and a third cylindrical sidewall, whereby said first cylindrical sidewall extends from said rim towards said second cylindrical sidewall wherein a first shoulder connects said first cylindrical sidewall and said second cylindrical sidewall and said second cylindrical sidewall extends towards said third cylindrical sidewall wherein a second shoulder connects said second cylindrical sidewall and said third cylindrical sidewall and a tubular sleeve comprising opposing open ends, a cylindrical sidewall extending between said opposing open ends wherein said cylindrical sidewall of said tubular sleeve comprises an outerwall surface and an inner wall surface and a plurality of ribs associated with said inner wall surface, whereby said container fits within said tubular sleeve, wherein the outer diameter of said second cylindrical sidewall is smaller than the outer diameter of said first cylindrical sidewall and larger than the outer diameter of said third cylindrical sidewall.

* * * * *